United States Defensive Publication [19] (H) [11] T978,005

Funck [43] Jan. 2, 1979

[54] PROCESS FOR EXTRUDING POLYETHYLENE

[75] Inventor: Dennis L. Funck, Wilmington, Del.

[73] Assignee: Alcan Aluminum Corporation, Cleveland, Ohio

[21] Appl. No.: 891,063

[22] Filed: Mar. 28, 1978

Related U.S. Application Data

[63] Continuation of Ser. No. 697,628, Jun. 18, 1976, abandoned, which is a continuation of Ser. No. 250,344, May 4, 1972, abandoned.

[51] Int. Cl.[2] ..... B29F 3/08

[52] U.S. Cl. ..... 264/85; 264/564; 264/237

[57] ABSTRACT

A process is provided wherein polyethylene is melt-extruded in tubular form while simultaneously maintaining an environment of an inert gas such as nitrogen internally of the tubular form of polyethylene to preclude formation of a layer of large spherulites.

1 Claim, No Sheet Drawing,

12 Pages Specification

The file of this unexamined application may be inspected and copies thereof may be purchased (849 O.G. 1221, Apr. 9, 1968).